(12) United States Patent
Kim et al.

(10) Patent No.: US 12,450,121 B2
(45) Date of Patent: Oct. 21, 2025

(54) STORAGE DEVICE AND STORAGE SYSTEM

(71) Applicant: Samsung Electronics Co., Ltd., Suwon-si (KR)

(72) Inventors: Jungsoo Kim, Suwon-si (KR); Dongouk Moon, Suwon-si (KR); Kyungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 18/348,713

(22) Filed: Jul. 7, 2023

(65) Prior Publication Data

US 2024/0045765 A1 Feb. 8, 2024

(30) Foreign Application Priority Data

Aug. 2, 2022 (KR) ........................ 10-2022-0096274

(51) Int. Cl.
*G06F 11/30* (2006.01)
*G06F 11/14* (2006.01)

(52) U.S. Cl.
CPC ........ *G06F 11/141* (2013.01); *G06F 11/1441* (2013.01); *G06F 11/3037* (2013.01)

(58) Field of Classification Search
CPC . G06F 11/141; G06F 11/1441; G06F 11/3037
See application file for complete search history.

(56) References Cited

U.S. PATENT DOCUMENTS

| | | | |
|---|---|---|---|
| 9,575,855 B2 | 2/2017 | Maeda et al. | |
| 9,836,345 B2 | 12/2017 | Reger et al. | |
| 9,996,436 B2 | 6/2018 | Keremane et al. | |
| 10,372,558 B2 | 8/2019 | Park et al. | |
| 10,983,879 B1 | 4/2021 | Agrawal et al. | |
| 2007/0169088 A1* | 7/2007 | Lambert | G06F 11/0709 717/168 |
| 2008/0126615 A1* | 5/2008 | Sinclair | G06F 11/201 710/38 |
| 2012/0239920 A1* | 9/2012 | Yang | G06F 8/65 713/2 |
| 2015/0248334 A1* | 9/2015 | Lucas | G06F 11/1433 714/23 |
| 2017/0040057 A1 | 2/2017 | Cho et al. | |
| 2019/0121561 A1 | 4/2019 | Okamura et al. | |
| 2020/0409885 A1 | 12/2020 | Denworth et al. | |
| 2021/0056023 A1 | 2/2021 | Jin et al. | |

OTHER PUBLICATIONS

Extended European Search Report corresponding to European Patent Application No. 23186814.2 (7 pages) (dated Dec. 21, 2023).

* cited by examiner

*Primary Examiner* — Bryce P Bonzo
*Assistant Examiner* — Audrey Emma Whitesell

(57) ABSTRACT

Provided is a storage device including a non-volatile memory, a memory controller configured to communicate with a host device through a first channel and configured to control the non-volatile memory, and a sub controller configured to communicate with the host device through a second channel and configured to monitor an operation status of the memory controller. The sub controller is configured to perform operations including broadcasting state information of the storage device including the operation status to at least one external device through the second channel, and performing a recovery operation on the memory controller when recovery information is received from the at least one external device through the second channel.

20 Claims, 11 Drawing Sheets

FIG. 4

| STATE INFORMATION | | | |
|---|---|---|---|
| IDENTIFICATION FROM | OPERATION STATUS | REGISTER VALUE | TIME |
| FIRST | ABNORMAL | SOME VALUE | 202201230123 |

FIG. 6

| RECOVERY INFORMATION | | | |
|---|---|---|---|
| IDENTIFICATION FROM | IDENTIFICATION TO | REGISTER VALUE | TIME |
| SECOND | FIRST | SOME VALUE | 202201230124 |

STORAGE DEVICE AND STORAGE SYSTEM

CROSS-REFERENCE TO RELATED APPLICATION

This application is based on and claims priority under 35 U.S.C. § 119 to Korean Patent Application No. 10-2022-0096274, filed on Aug. 2, 2022, in the Korean Intellectual Property Office, the disclosure of which is incorporated by reference herein in its entirety.

BACKGROUND

The inventive concept relates to a storage device, and more particularly, to a storage device capable of recovering an abnormal state to a normal state.

Recently, storage devices including a non-volatile memory, such as a solid state drive (SSD), an embedded universal flash storage (UFS) memory device, and/or an embedded multi-media card (eMMC), have been widely used. A memory controller included in the storage device may control data write operations and read operations to and from the non-volatile memory, and may also manage the non-volatile memory. The memory controller may operate by executing firmware for controlling the non-volatile memory, and the firmware may include pieces of code, and data generated by the execution of the pieces of code may be stored in a memory.

The memory controller may enter an abnormal state, such as a deadlock, when an error occurs or an abnormal operation is detected during code execution. For example, when a register value used for an operation of pieces of code including firmware is out of a normal range, the memory controller may be in an abnormal state. If the operation state of the memory controller is abnormal, communication between the memory controller and a host device becomes impossible and accordingly, normal operations of the storage device including the memory controller and an electronic device including the storage device may become difficult. Therefore, it is necessary to develop a method for restoring the operation status of the memory controller to a normal state.

SUMMARY

The inventive concept provides a storage device capable of recovering a memory controller from an abnormal state to a normal state.

According to some embodiments of the inventive concept, there is provided a storage device including a non-volatile memory, a memory controller configured to communicate with a host device through a first channel and configured to control the non-volatile memory, and a sub controller configured to communicate with the host device through a second channel and configured to monitor an operation status of the memory controller The sub controller is configured to perform operations including broadcasting state information of the storage device including the operation status to at least one external device through the second channel, and performing a recovery operation on the memory controller when recovery information is received from the at least one external device through the second channel.

According to some embodiments of the inventive concept, there is provided a storage device including a first storage device including a first non-volatile memory, a first memory controller configured to communicate with a host device through a first channel, and a first sub controller configured to communicate with the host device through a second channel, and a second storage device including a second non-volatile memory, a second memory controller configured to communicate with the host device through the first channel, and a second sub controller configured to communicate with the host device through the second channel. The first sub controller is configured to broadcast state information of the first storage device including an operation status of the first memory controller through the second channel. The second sub controller is configured to generate recovery information of the first storage device based on previous state information of the first storage device when the operation status of the first memory controller is abnormal in response to the state information of the first storage device, and configured to transmit the recovery information that was generated to the first storage device through the second channel.

According to some embodiments of the inventive concept, there is provided a storage system including a host device, and a plurality of storage devices including a non-volatile memory, a memory controller configured to communicate with the host device through a first channel, and a sub controller configured to communicate with the host device through a second channel. A first sub controller included in a first storage device among the plurality of storage devices is configured to broadcast state information including an operation status that is an abnormal state through the second channel. A second sub controller included in a second storage device among the plurality of storage devices is configured to generate recovery information of the first storage device based on previous state information of the first storage device, and is configured to transmit the recovery information that was generated to the first storage device through the second channel.

BRIEF DESCRIPTION OF THE DRAWINGS

Embodiments of the inventive concept will be more clearly understood from the following detailed description taken in conjunction with the accompanying drawings in which:

FIG. 4 is a diagram illustrating an example of state information broadcast by a storage device according to some embodiments of the present disclosure;

FIG. 6 is a diagram illustrating an example of recovery information received by a storage device according to some embodiments of the present disclosure;

DETAILED DESCRIPTION

Hereinafter, embodiments of the present disclosure will be described in detail with reference to the accompanying drawings.

Figure 1:
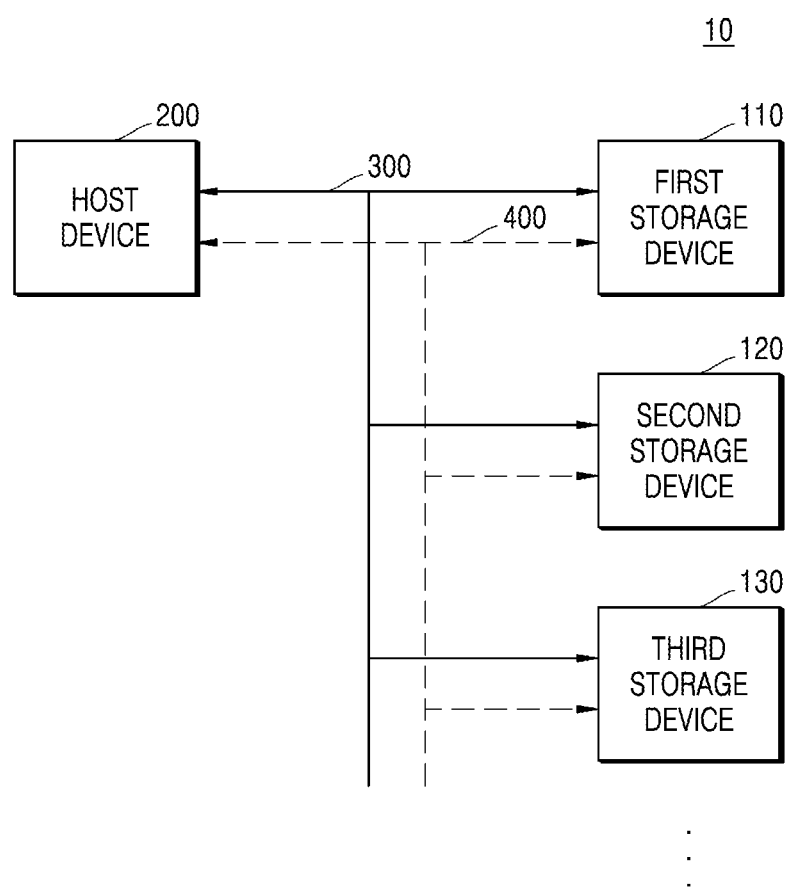
FIG. 1 is a diagram illustrating a storage system according to some embodiments of the present disclosure.

FIG. 1 is a diagram illustrating a storage system according to some embodiments of the present disclosure.

Referring to FIG. 1, a storage system 10 according to some embodiments of the present disclosure may include a first storage device 110, a second storage device 120, a third storage device 130, and a host device 200. The first storage device 110, the second storage device 120, and the third storage device 130 may be referred to as a plurality of storage devices.

In some embodiments of the present disclosure, the storage system 10 may be implemented as a personal computer (PC), a data server, a network-coupled storage, an Internet of Things (IoT) device, or a portable electronic device. The portable electronic device may be any one of a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

Each of the plurality of storage devices 110, 120, and 130 may be an internal memory embedded in an electronic device. For example, each of the plurality of storage devices 110, 120, and 130 may be a solid state drive (SSD), an embedded universal flash storage (UFS) memory device, or an embedded multi-media card (eMMC). In some embodiments, each of the plurality of storage devices 110, 120, and 130 may be an external memory detachable from the electronic device. For example, the plurality of storage devices 110, 120, and 130 may be a UFS memory card, a Compact Flash (CF) card, a Secure Digital (SD), Micro Secure Digital (Micro-SD) card, a Mini Secure Digital (Mini-SD) card, an extreme digital (xD) card or a Memory Stick.

Regarding FIG. 1, although some embodiments in which the storage system 10 includes the first storage device 110, the second storage device 120, and the third storage device 130 is illustrated, the present disclosure is not limited thereto. That is, unlike the embodiment of FIG. 1, the storage system 10 may include only the first storage device 110 and the second storage device 120, and/or may further include an additional storage device, such as a fourth storage device.

The host device 200 may communicate with the plurality of storage devices 110, 120, and 130 through various interfaces. In some embodiments, the host device 200 may be implemented as an application processor (AP) or a system-on-a-chip (SoC).

The plurality of storage devices 110, 120, and 130 and the host device 200 may be connected to one another through a first channel 300 and a second channel 400.

In some embodiments of the present disclosure, the first channel 300 may be an in-band channel. The first channel 300 may be used for data exchange between the plurality of storage devices 110, 120, and 130 and the host device 200. The host device 200 may transmit a read request or a write request to the plurality of storage devices 110, 120, and 130 through the first channel 300. In addition, the plurality of storage devices 110, 120, and 130 may transmit data corresponding to a read request or a response corresponding to a write request through the first channel 300.

In some embodiments of the present disclosure, the second channel 400 may be an out-of-band channel. The second channel 400 may be used for a recovery operation of the plurality of storage devices 110, 120, and 130. The plurality of storage devices 110, 120, and 130 may broadcast state information to be described later through the second channel 400. Also, the plurality of storage devices 110, 120, and 130 may transmit recovery information to be described later through the second channel 400.

The first channel 300 and the second channel 400 may be channels that enable communication between devices using at least one of various interface protocols, such as Serial Advanced Technology Attachment (SATA), Small Computer Small Interface (SCSI), Non-Volatile Memory Express (NVMe), Serial Attached SCSI (SAS), Compute eXpress Link (CXL), UFS, eMMC, or the like.

A more detailed configuration and operation of the plurality of storage devices 110, 120, 130 and the host device 200, and the connection between the first channel 300 and the second channel 400 of the plurality of storage devices 110, 120, and 130 and the host device 200 may be described in more detail with reference to FIG. 2.

Figure 2:
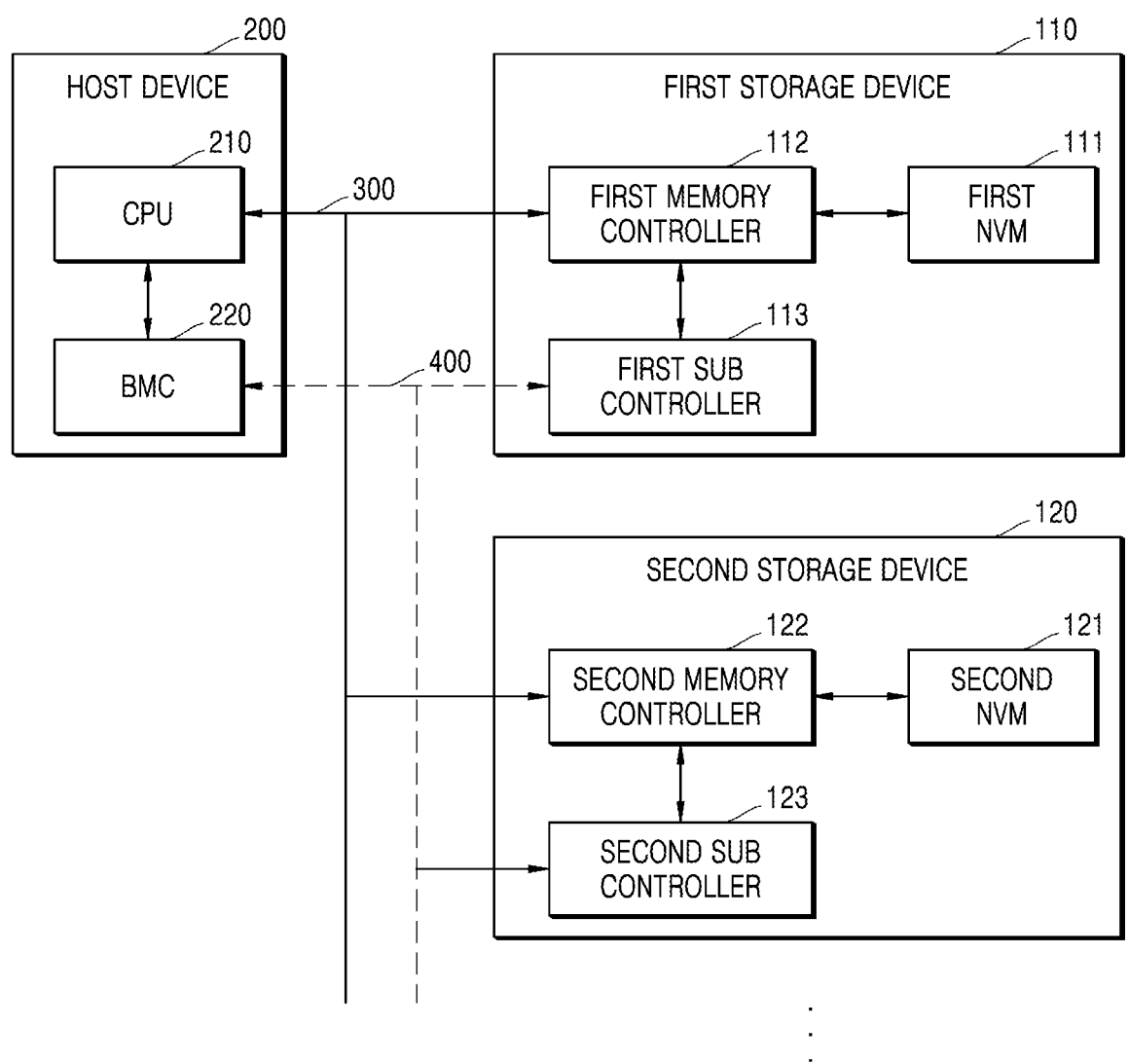
FIG. 2 is a block diagram illustrating in more detail a host device and components of a storage device included in a storage system according to some embodiments of the present disclosure.

FIG. 2 is a block diagram illustrating in more detail components of a host device and a storage device included in a storage system according to some embodiments of the present disclosure.

Referring to FIG. 2, the storage system 10 according to some embodiments of the present disclosure may include a first storage device 110, a second storage device 120, and a host device 200.

The first storage device 110 may include a first non-volatile memory 111, a first memory controller 112, and a first sub controller 113. Also, the second storage device 120 may include a second non-volatile memory 121, a second memory controller 122, and a second sub controller 123. At this time, although FIG. 2 shows some embodiments in which the storage system 10 includes the first storage device 110 and the second storage device 120, the present disclosure is not limited thereto, and the storage system 10 may further include one or more storage devices each including a non-volatile memory, a memory controller, and/or a sub controller.

In the following description with reference to FIG. 2, the first storage device 110 and the second storage device 120 may be collectively referred to as storage devices 110 and 120, the first non-volatile memory 111 and the second non-volatile memory 121 may be collectively referred to as non-volatile memories 111 and 121, the first memory controller 112 and the second memory controller 122 may be collectively referred to as memory controllers 112 and 122, and the first sub controller 113 and the second sub controller 123 may be collectively referred to as sub controllers 113 and 123.

The non-volatile memories 111 and 121 may include a memory cell array (MCA). The MCA may include memory blocks. The memory block may include a plurality of pages. Here, z and k may be positive integers, respectively, and may be variously changed according to embodiments. For example, a memory block may be a unit of erasing, and a page may be a unit of writing and reading.

In some embodiments, the MCA may include a plurality of planes, a plurality of dies, or a plurality of chips. In some embodiments, the non-volatile memories 111 and 121 may include a flash memory device, for example, a NAND flash memory device. However, the inventive concept is not limited thereto, and the non-volatile memories 111 and 121 may include resistive memory devices, such as resistive RAM (ReRAM), phase change RAM (PRAM), and/or magnetic RAM (MRAM).

The memory controllers 112 and 122 may be connected to the host device 200 through the first channel 300. The memory controllers 112 and 122 may receive a read request for data stored in the non-volatile memories 111 and 121 from the host device 200 through the first channel 300. Also, the memory controllers 112 and 122 may receive a write request to store data in the non-volatile memories 111 and 121 from the host device 200 through the first channel 300.

The memory controllers 112 and 122 may control the non-volatile memories 111 and 121. The memory controllers 112 and 122 may read data corresponding to the read request received from the host device 200 from the non-volatile memories 111 and 121. Also, the memory controllers 112 and 122 may write data corresponding to the write request received from the host device 200 into the non-volatile memories 111 and 121.

Also, the memory controllers 112 and 122 may perform various functions, such as address mapping, wear leveling, garbage collection, and the like. The address mapping operation is an operation of changing a logical address received from the host device 200 into a physical address used to actually store data in the non-volatile memories 111 and 121. The wear leveling is an operation to prevent excessive deterioration of a certain block by allowing blocks in the non-volatile memories 111 and 121 to be uniformly used. The garbage collection is an operation to secure usable capacity in the non-volatile memories 111 and 121 by copying valid data of a block to a new block and then erasing the existing block.

The above-described operations of the memory controllers 112 and 122 may be implemented by firmware that includes of pieces of code. At this time, when the memory controllers 112 and 122 operate through the execution of pieces of code, the memory controllers 112 and 122 may be in a hang state in which an operation is unintentionally stopped due to an error in the code or may be in an abort state in which an abnormal operation in the memory controllers 112 and 122 is detected and the operation is intentionally stopped during code execution. The hang state and the abort state may collectively be referred to as a deadlock.

When the memory controllers 112 and 122 enter the hang state or the abort state, the memory controllers 112 and 122 may not communicate with the host device 200. Therefore, the storage devices 110 and 120 may not perform normal operations. Therefore, when the memory controllers 112 and 122 are in a hang state or an abort state, an operation to solve the problem may need to be performed.

The sub controllers 113 and 123 may be connected to the host device 200 through the second channel 400. Also, the sub controllers 113 and 123 may be connected to other sub controllers 113 and 123 through the second channel 400. In this case, the sub controllers 113 and 123 communicate through the second channel 400, and when the memory controllers 112 and 122 are in an abnormal state, a recovery operation may be performed.

In some embodiments of the present disclosure, the sub controllers 113 and 123 may be micro controller units (MCUs), and may be formed of chips separate from the memory controllers 112 and 122.

The sub controllers 113 and 123 may monitor respective operation statuses of the memory controllers 112 and 122.

The sub controllers 113 and 123 may monitor whether the memory controllers 112 and 122 are in a hang state or an abort state. When the operation status of the memory controllers 112 and 122 is a hang state or an abort state, the sub controllers 113 and 123 may determine the operation status of the memory controllers 112 and 122 to be an abnormal state. Also, when the operation status of the memory controllers 112 and 122 is not a hang state or an abort state, the sub controllers 113 and 123 may determine the operation status of the memory controllers 112 and 122 to be a normal state.

The sub controllers 113 and 123 may monitor the operation status of the memory controllers 112 and 122 at preset reference cycle intervals. The reference cycle is a cycle for monitoring the operation status of the memory controllers 112 and 122, and may be set considering the frequency of performing operations of the memory controllers 112 and 122.

The sub controllers 113 and 123 may broadcast state information of the storage devices 110 and 120 including the operation status through the second channel 400. Accordingly, at least one external device connected to the second channel 400 may receive state information of the storage devices 110 and 120. In this case, the at least one external device may be any one of the other storage devices 110 and 120 that do not broadcast state information among the storage devices 110 and 120 connected to the second channel 400. For example, when the first storage device 110 broadcasts state information, the second storage device 120 may be at least one external device.

The state information may include at least one of identification information, an operation status, a register value, and time information.

The identification information may be information that allows the storage devices 110 and 120 that have broadcast state information through the second channel 400 to be distinguished from other storage devices 110 and 120. The storage devices 110 and 120 may determine which storage devices 110 and 120 state information is the state information broadcast through the second channel 400 based on the identification information included in the state information.

The register value may be a value stored by a register included in the memory controllers 112 and 122. In some embodiments of the present disclosure, the register value may include at least one of the number of times garbage collection check logic is performed, a loop count of certain logic (e.g., a while statement or an if statement that is encountered), and the like.

When the register value is out of the normal range, the memory controllers 112 and 122 may be in a hang state or an abort state. When the operation status of the memory controllers 112 and 122 is in a normal state, the register value is stored in the other storage devices 110 and 120 and may be used to generate recovery information later.

The time information may be information indicating a time when the state information is generated. For example, the time information may be a time stamp. The storage devices 110 and 120 may distinguish the most recently stored state information from among a plurality of pre-stored state information, based on the time information.

The sub controllers 113 and 123 may broadcast state information through the second channel 400 at a reference cycle interval. For example, the cycle at which the sub controllers 113 and 123 broadcast state information may be the same as the cycle at which the sub controllers 113 and 123 monitor the operation status of the memory controllers 112 and 122, but the present disclosure is not limited thereto. Accordingly, the sub controllers 113 and 123 may broadcast all of the generated state information through the second channel 400.

Also, when the storage devices 110 and 120 are in an idle state, the sub controllers 113 and 123 may broadcast state information of the storage devices 110 and 120 through the second channel 400. In this case, the sub controllers 113 and 123 may broadcast the initial state information together with main state information of the storage devices 110 and 120 through the second channel 400.

The sub controllers 113 and 123 may receive state information of other storage devices 110 and 120 through the second channel 400. For example, the first sub controller 113 may broadcast state information of the first storage device 110 through the second channel 400 and receive state information of the second storage device 120.

The sub controllers 113 and 123 may store state information of other storage devices 110 and 120 received through the second channel 400. In addition, the sub controllers 113 and 123 may use the stored state information of the other storage devices 110 and 120 when generating recovery information of the other storage devices 110 and 120.

If the received operation status of the memory controllers 112 and 122 of the other storage devices 110 and 120 is abnormal, the sub controllers 113 and 123 may generate recovery information of the other storage devices 110 and 120 based on previous state information of the other storage devices 110 and 120. Previous state information is pre-stored state information of other storage devices 110 and 120, and may be state information of the other storage devices 110 and 120 received when the operation status of the memory controllers 112 and 122 of the other storage devices 110 and 120 is in a normal state.

When receiving state information of other storage devices 110 and 120 through the second channel 400, the sub controllers 113 and 123 may check the operation status of the memory controllers 112 and 122 of the other storage devices 110 and 120 included in the state information. In addition, when it is confirmed that the operation status of the memory controllers 112 and 122 of the other storage devices 110 and 120 is abnormal, the sub controllers 113 and 123 may generate recovery information of the other storage devices 110 and 120 based on previously stored previous state information of the other storage devices 110 and 120.

The recovery information may include at least one of identification information of a transmitting device, identification information of a receiving target device, a register value, and time information.

The identification information of the transmitting device is information that distinguishes the storage devices 110 and 120 that have transmitted the recovery information through the second channel 400 from other storage devices 110 and 120.

The identification information of the receiving target device is information that allows the storage devices 110 and 120 to receive recovery information through the second channel 400 to be distinguished from other storage devices 110 and 120. For example, the first sub controller 113 may determine whether the received recovery information is information to be used for recovery of the first memory controller 112 connected to the first sub controller 113 based on the identification information of the receiving target device included in the recovery information.

The register value may be a register value to be used for recovery of the memory controllers 112 and 122 included in the receiving target device. The register value may be used to recover the memory controllers 112 and 122 in an abnormal state as being input as the register value of the memory controllers 112 and 122 of the receiving target device by the sub controllers 113 and 123 of the receiving target device.

In this case, the sub controllers 113 and 123 may set a register value included in state information having the most recent time information among previously stored previous state information as a register value of the recovery information. Accordingly, when the memory controllers 112 and 122 in the abnormal state are in the normal state, the most recently used register value may be transmitted as recovery information.

The time information may be information indicating a time at which the recovery information is generated.

The sub controllers 113 and 123 may transmit the generated recovery information of the other storage devices 110 and 120 to the other storage devices 110 and 120 through the second channel 400. Accordingly, when the other storage devices 110 and 120 are in an abnormal state, they may receive recovery information.

The sub controllers 113 and 123 may receive recovery information from other storage devices 110 and 120 through the second channel 400. The sub controllers 113 and 123 may perform a recovery operation on the memory controllers 112 and 122 by using the received recovery information. The sub controllers 113 and 123 may perform a recovery operation on the memory controllers 112 and 122 by inputting a register value included in the recovery information to the memory controllers 112 and 122. Since the memory controllers 112 and 122 may be in a hang state and/or an abort state when the register value is out of the normal range, the sub controllers 113 and 123 may allow the register values of the memory controllers 112 and 122 to have the most recent values they had when the memory controllers 112 and 122 were in a normal state by inputting the register value included in the recovery information as the register value of the memory controllers 112 and 122.

As such, in the storage devices 110 and 120 of the present disclosure, the sub controllers 113 and 123 broadcast state information including the operation status of the memory controllers 112 and 122, receive recovery information from the other storage devices 110 and 120, perform a recovery operation on the memory controllers 112 and 122, and restore the storage devices 110 and 120 that are in an abnormal state so that they may quickly operate normally.

The host device 200 may include a central processing unit (CPU) 210 and a baseboard management controller (BMC) 220.

The CPU 210 may be connected to the memory controllers 112 and 122 of the storage devices 110 and 120 through the first channel 300. The CPU 210 may transmit a read request or a write request to the storage devices 110 and 120 through the first channel 300.

The BMC 220 may be connected to the sub controllers 113 and 123 of the storage devices 110 and 120 through the second channel 400. The BMC 220 may receive state information broadcast by the sub controllers 113 and 123 through the second channel 400.

Figure 3:
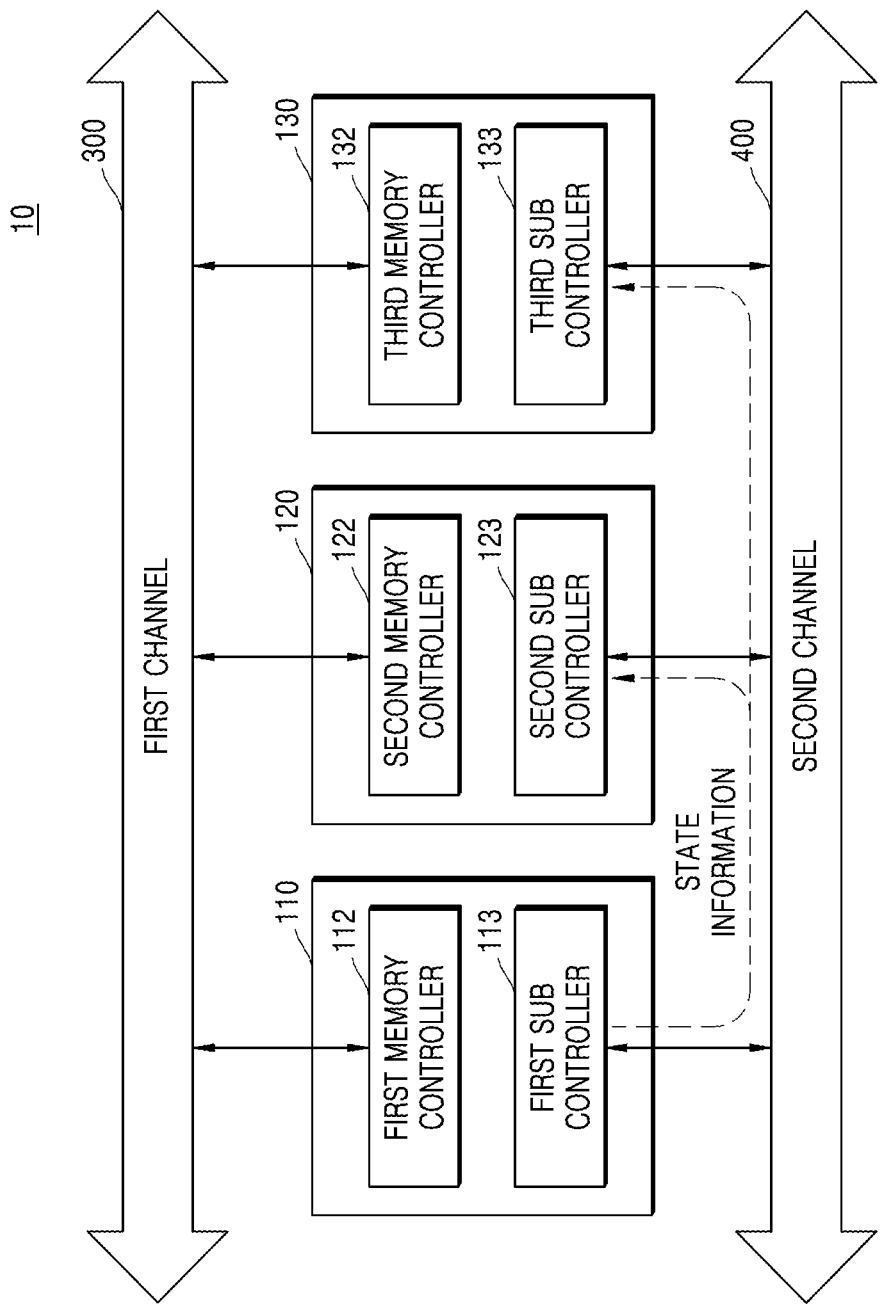
FIG. 3 is a diagram illustrating movement of state information between storage devices according to some embodiments of the present disclosure.

FIG. 3 is a diagram illustrating movement of state information between storage devices according to some embodiments of the present disclosure.

Referring to FIG. 3, the storage system 10 according to some embodiments of the present disclosure may include a first storage device 110, a second storage device 120, and a third storage device 130. In addition, the first storage device 110, the second storage device 120, and the third storage device 130 may be connected to each other through the first channel 300 and the second channel 400.

The first memory controller 112, the second memory controller 122, and the third memory controller 132 may communicate with each other through the first channel 300. In addition, the first sub controller 113, the second sub controller 123, and the third sub controller 133 may communicate with each other through the second channel 400.

In this case, the state information generated by any one of the first sub controller 113, the second sub controller 123, and the third sub controller 133 may be broadcast through the second channel 400. In embodiments of FIG. 3, the state information generated by the first sub controller 113 may be broadcast to the second sub controller 123 and the third sub controller 133 through the second channel 400.

FIG. 4 is a diagram illustrating an example of state information broadcast by a storage device according to some embodiments of the present disclosure.

Referring to FIG. 4, state information may include identification information IDENTIFICATION FROM, an operation status OPERATION STATUS, a register value REGISTER VALUE, and time information TIME.

In embodiments of FIG. 4, the identification information IDENTIFICATION FROM may be FIRST, and may indicate that the storage device broadcasting the state information is the first storage device 110. In some embodiments, the identification information IDENTIFICATION FROM may be SECOND, THIRD, or the like, and refer to the second storage device 120, the third storage device 130, etc.

In embodiments of FIG. 4, the operation status OPERATION STATUS may be ABNORMAL, and may indicate that the memory controller of the storage device broadcasting the state information is in an abnormal state. In some embodiments, the operation status OPERATION STATUS may be NORMAL, and may indicate that the memory controller of the storage device broadcasting the state information is in a normal state.

In embodiments of FIG. 4, the register value REGISTER VALUE may have a certain value SOME VALUE, which may be a register value stored in the memory controller of the storage device broadcasting state information.

In embodiments of FIG. 4, the time information TIME may be 202201230123, and may indicate a time when the storage device generates state information.

Figure 5:
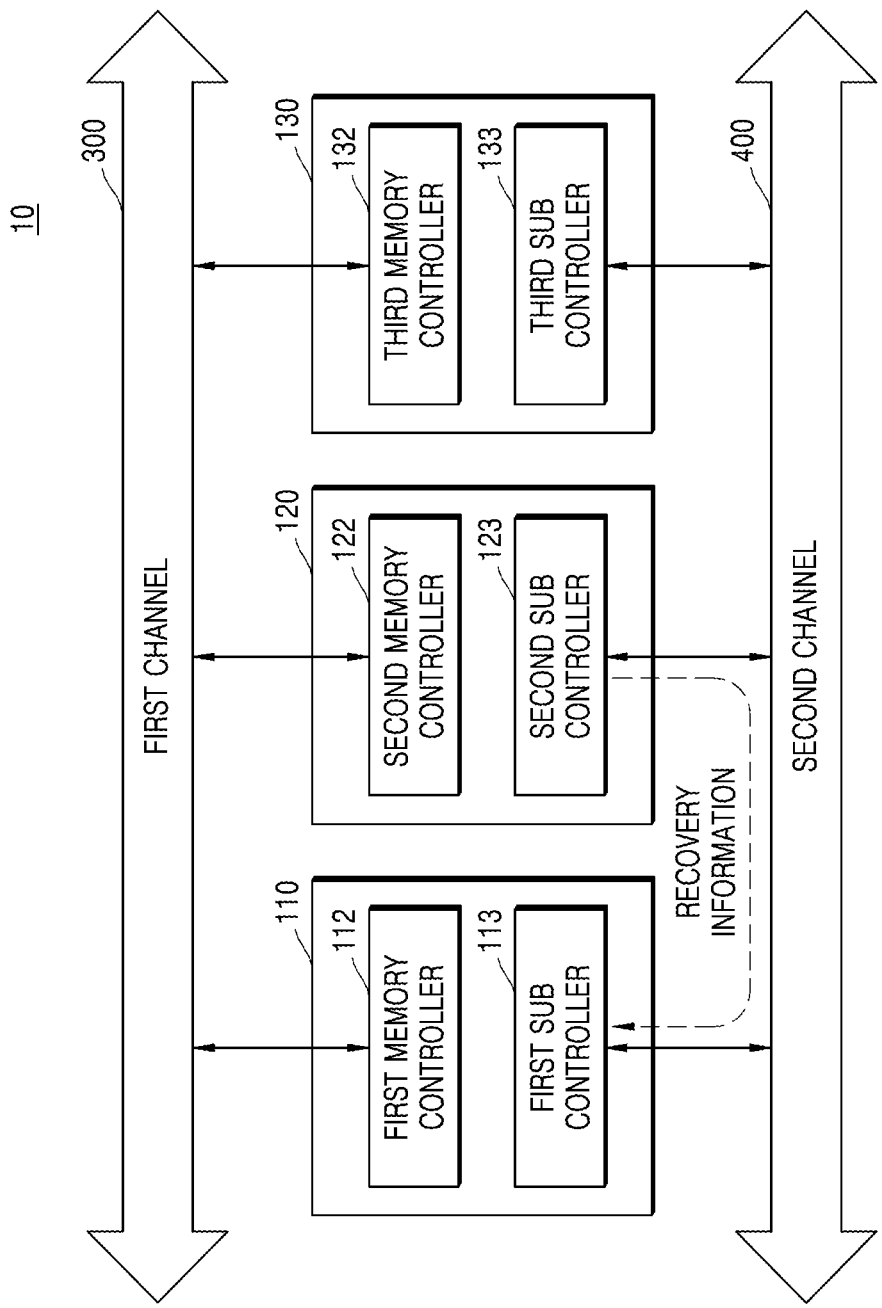
FIG. 5 is a diagram illustrating movement of recovery information between storage devices according to some embodiments of the present disclosure.

FIG. 5 is a diagram illustrating movement of recovery information between storage devices according to some embodiments of the present disclosure.

Referring to FIG. 5, a diagram showing the movement of recovery information to the storage system 10 as shown in FIG. 3 may be confirmed.

As shown in FIG. 3, when the first sub controller 113 broadcasts state information through the second channel 400, the second sub controller 123 and the third sub controller 133 may determine whether the operation status included in the received state information is an abnormal state. In addition, if the operation status included in the received state information is abnormal, the second sub controller 123 and the third sub controller 133 may generate recovery information of the first storage device 110 based on previously stored previous state information of the first storage device 110.

As the operation status included in the state information broadcast by the first sub controller 113 is in an abnormal state, both the second sub controller 123 and the third sub controller 133 may generate recovery information. At this time, in some embodiments of the present disclosure, among the second sub controller 123 and the third sub controller 133, the sub controller that first completes generation of the recovery information may transmit the recovery information of the first storage device 110 through the second channel 400.

In general, the recovery information may be generated by any of the second sub controller 123 and the third sub controller 133. However, if the operation status included in the state information first broadcast by the first sub controller 113 is in an abnormal state, since the second sub controller 123 and the third sub controller 133 do not have pre-stored previous state information, they may not generate recovery information. In this case, among the second storage device 120 including the second sub controller 123 and the third storage device 130 including the third sub controller 133, recovery information may be generated using a register value of a memory controller included in a storage device disposed in the same redundant array of inexpensive disks (RAID) as the first storage device 110. That is, only when the operation status included in the state information first broadcast by the first sub controller 113 is in an abnormal state, the recovery information may be generated by the sub controller of the storage device disposed in the same RAID as the first storage device 110, not by any sub controller.

FIG. 5 shows some embodiments in which the second sub controller 123 generates recovery information and transmits the generated recovery information to the first sub controller 113 through the second channel 400. In this case, the second sub controller 123 for transmitting the recovery information may be set as a master device among devices connected to the second channel 400. Accordingly, the second sub controller 123 may transmit the recovery information to the first sub controller 113 with priority over other sub controllers broadcasting state information.

By setting the sub controller that transmits the recovery information in this way as a master device between devices connected to the second channel 400, it is possible to recover the memory controller in an abnormal state more quickly, and it is possible to prevent a collision between information transmitted through the second channel 400.

FIG. 6 is a diagram illustrating an example of recovery information received by a storage device according to some embodiments of the present disclosure.

Referring to FIG. 6, recovery information may include identification information IDENTIFICATION FROM of the transmitting device, identification information IDENTIFICATION TO of the receiving target device, a register value REGISTER VALUE, and time information TIME.

In embodiments of FIG. 6, the identification information IDENTIFICATION FROM of the transmitting device may be SECOND, and may indicate that the storage device transmitting the recovery information is the second storage device 120. In some embodiments, the identification information IDENTIFICATION FROM of the transmitting device may be FIRST, THIRD, or the like.

In embodiments of FIG. 6, the identification information IDENTIFICATION TO of the receiving target device may be FIRST, and may indicate that the storage device that is supposed to receive the recovery information is the first storage device 110. In some embodiments, the identification information IDENTIFICATION FROM of the transmitting device may be SECOND, THIRD, or the like.

In embodiments of FIG. 6, the register value REGISTER VALUE may have a certain value SOME VALUE, which may be a register value to be input to the memory controller of the storage device that has received the recovery information.

In embodiments of FIG. 6, the time information TIME may be 202201230124 and may indicate a time when the storage device generates the recovery information.

Figure 7:
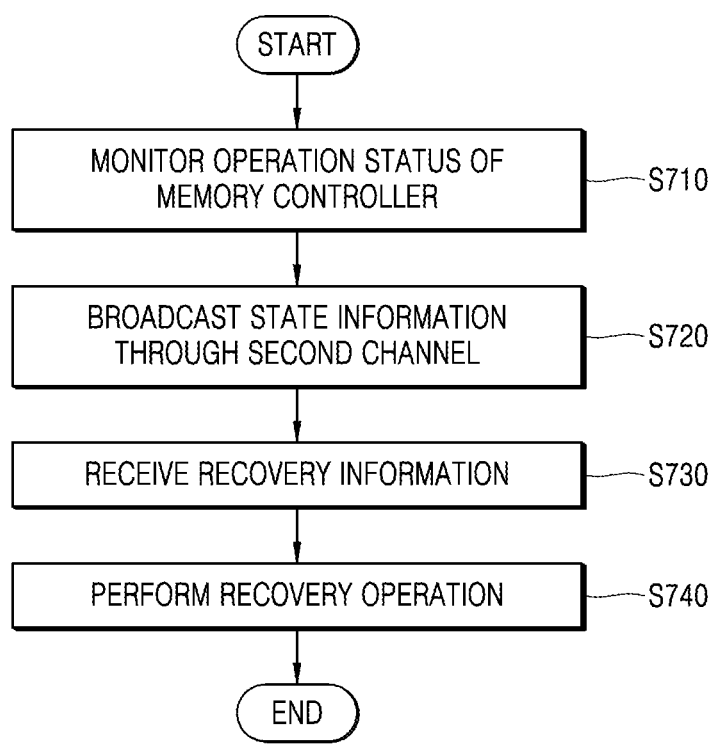
FIG. 7 is a flowchart illustrating a method of operating a storage device, according to some embodiments of the present disclosure.

FIG. 7 is a flowchart illustrating a method of operating a storage device, according to some embodiments of the present disclosure. Hereinafter, for convenience of description, some embodiments in which an operation as in the flowchart of FIG. 7 is performed in the first storage device 110 will be mainly described.

Referring to FIG. 7, in operation S710, the first sub controller 113 may monitor the operation status of the first memory controller 112. The first sub controller 113 may monitor the operation status of the first memory controller 112 at a preset reference cycle interval. The first sub controller 113 may monitor the operation status of the first memory controller 112 and generate state information of the first storage device 110 including the operation status of the first memory controller 112.

In operation S720, the first sub controller 113 may broadcast state information of the first storage device 110 including the operation status of the first memory controller 112 through the second channel 400. The first sub controller 113 may broadcast state information of the first storage device 110 at a preset reference cycle interval. Accordingly, the sub controller (e.g., the second sub controller 123 of the second storage device 120 or the third sub controller 133 of the third storage device 130) of another storage device connected to the second channel 400 may receive state information. The sub controller of the other storage device that has received the state information may generate recovery information when the operation status included in the state information is in an abnormal state. In addition, the sub controller of the other storage device may transmit the generated recovery information to the first sub controller 113 of the first storage device 110 through the second channel 400.

In operation S730, the first sub controller 113 may receive recovery information. At this time, the first sub controller 113 may monitor that the operation status of the memory controller is abnormal in operation S710, and receive recovery information when the device broadcasts the state information in which the operation status is abnormal in operation S720 through the second channel 400.

In operation S740, the first sub controller 113 may perform a recovery operation on the first memory controller 112 using the received recovery information. The first sub controller 113 may perform a recovery operation on the first memory controller 112 by inputting a register value included in the recovery information to the first memory controller 112.

Figure 8:
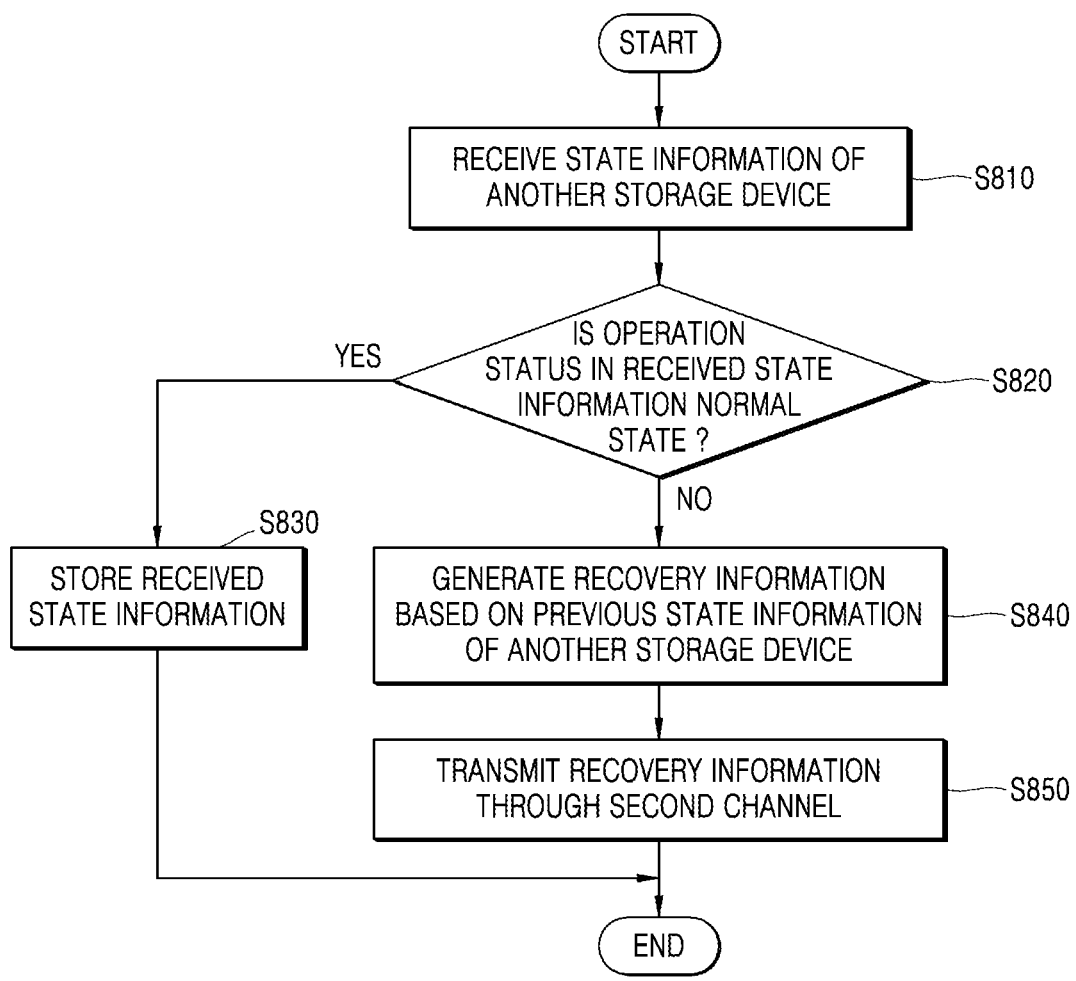
FIG. 8 is a flowchart illustrating an operation when a storage device receives state information of another storage device according to some embodiments of the present disclosure.

FIG. 8 is a flowchart illustrating an operation when a storage device receives state information of another storage device according to some embodiments of the present disclosure. Hereinafter, for convenience of description, some embodiments in which an operation as in the flowchart of FIG. 8 is performed in the second storage device 120 will be mainly described.

Referring to FIG. 8, in operation S810, the second sub controller 123 may receive state information of another storage device (e.g., the first storage device 110 or the third storage device 130). The second sub controller 123 may receive state information broadcast by another storage device through the second channel 400.

In operation S820, the second sub controller 123 may determine whether the operation status in the received state information is a normal state.

If it is determined that the operation status in the received state information is a normal state, in operation S830, the second sub controller 123 may store the received state information. The stored state information becomes previous state information and may be used to generate recovery information later.

Conversely, if it is determined that the operation status in the received state information is in an abnormal state, in operation S840, the second sub controller 123 may generate recovery information based on previous state information of another storage device. In addition, in operation S850, the second sub controller 123 may transmit recovery information to another storage device through the second channel 400.

Figure 9:
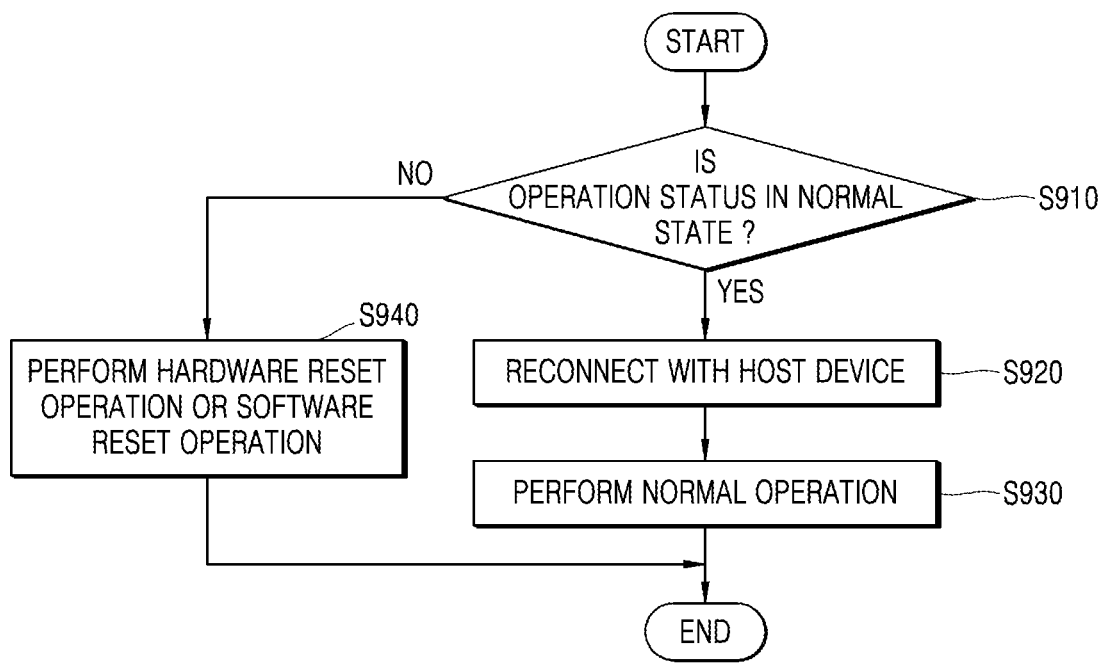
FIG. 9 is a flowchart illustrating an operation after a storage device performs a recovery operation according to some embodiments of the present disclosure.

FIG. 9 is a flowchart illustrating an operation after a storage device performs a recovery operation according to some embodiments of the present disclosure. Hereinafter, for convenience of description, some embodiments in which an operation as in the flowchart of FIG. 9 is performed in the first storage device 110 will be mainly described.

Referring to FIG. 9, in operation S910, the first memory controller 112 may determine whether the operation status is in a normal state by performing a verification operation after the recovery operation by the first sub controller 113 is completed. The first memory controller 112 may execute verification code to perform a verification operation. In this case, if an error does not occur after performing the verification code, the first memory controller 112 may determine the operation status to be a normal state. In addition, if an error occurs after performing the verification code, the first memory controller 112 may determine the operation status to be an abnormal state.

If it is determined that the operation status is in a normal state, in operation S920, the first memory controller 112 may be reconnected with the host device 200 through the first channel 300. Then, in operation S930, the first memory controller 112 may perform a normal operation such as exchanging data with the host device 200.

Conversely, if it is determined that the operation status is an abnormal state, in operation S940, the first memory controller 112 may perform a hardware reset operation or a software reset operation.

In this case, when the abnormal state of the first memory controller 112 is not caused by an error in a register value, but by a hardware failure or an error in firmware, in the verification operation performed after the recovery operation, the operation status of the first memory controller 112 may be determined to be an abnormal state. Accordingly, the first memory controller 112 may restore the first memory controller 112 to a normal state by performing a hardware reset operation or a software reset operation.

The first memory controller 112 may initialize the firmware by performing a software reset operation when the normal state is not restored through the input of the register value by the first sub controller 113. In some embodiments of the present disclosure, the software reset operation may be performed by inputting a predefined register value to the first memory controller 112. When the operation status of the first memory controller 112 is not restored to a normal state through a software reset operation, the first memory controller 112 may perform a hardware reset operation.

In some embodiments of the present disclosure, the hardware reset operation may be performed using a dedicated pin connected between the host device 200 and the first storage device 110. That is, the hardware reset operation may be performed using a dedicated pin configured separately from an existing reset pin, a data transmission pin, and the like connected between the host device 200 and the first storage device 110.

Figure 10:
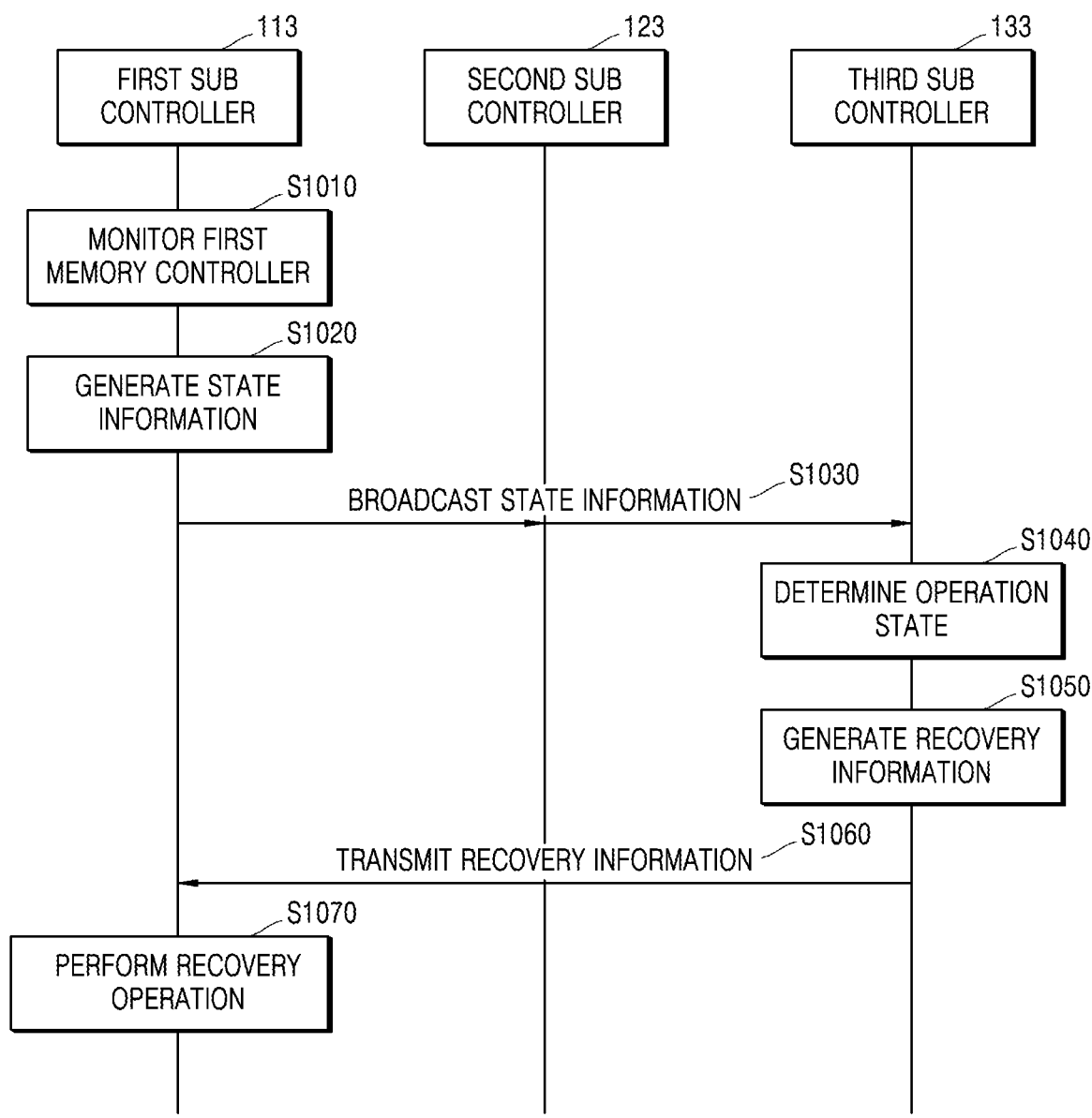
FIG. 10 is a flowchart illustrating a method of operating a storage system, according to some embodiments of the present disclosure.

FIG. 10 is a flowchart illustrating a method of operating a storage system, according to some embodiments of the present disclosure.

Referring to FIG. 10, in operation S1010, the first sub controller 113 may monitor the operation status of the first memory controller 112.

In operation S1020, the first sub controller 113 may generate state information of the first storage device 110.

In operation S1030, the first sub controller 113 may broadcast state information of the first storage device 110 through the second channel 400. Accordingly, the second sub controller 123 and the third sub controller 133 may receive state information of the first storage device 110.

In operation S1040, the third sub controller 133 may determine whether the operation status included in the state information of the first storage device 110 is in an abnormal state.

If it is determined that the operation status included in the state information of the first storage device 110 is in an abnormal state, in operation S1050, the third sub controller 133 may generate recovery information of the first storage device 110.

In operation S1060, the third sub controller 133 may transmit recovery information of the first storage device 110 to the first sub controller 113. Accordingly, the first sub controller 113 may receive recovery information of the first storage device 110.

In operation S1070, the first sub controller 113 may perform a recovery operation of the first memory controller 112 based on the received recovery information.

Figure 11:
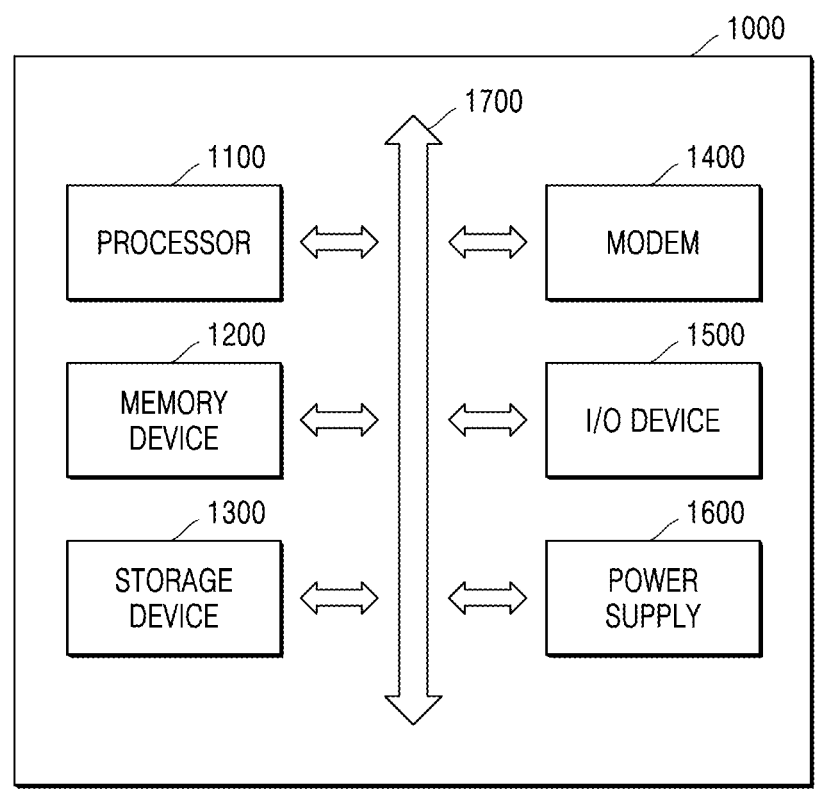
FIG. 11 is a block diagram illustrating an electronic device according to some embodiments of the present disclosure.

FIG. 11 is a block diagram illustrating an electronic device according to some embodiments of the present disclosure.

Referring to FIG. 11, an electronic device 1000 may include a processor 1100, a memory device 1200, a storage device 1300, a modem 1400, an input/output (I/O) device 1500, and a power supply 1600.

The storage device 1300 may include a plurality of storage devices, and each of the plurality of storage devices may include a non-volatile memory, a memory controller, and a sub controller. The storage device 1300 and the processor 1100, the memory device 1200, the modem 1400, the I/O device 1500, and the power supply 1600 may be connected through the channel 1700, and the channel 1700 may include a first channel used for data exchange and a second channel used for a recovery operation of the storage device 1300. Although not clearly illustrated in FIG. 11, a plurality of storage devices may be connected through the first channel and the second channel.

In some embodiments of the present disclosure, each of the plurality of storage devices broadcasts state information including the operation status of the memory controller through the sub controller, and receives recovery information from another storage device and performs a recovery operation on the memory controller, so that a storage device that is in an abnormal state may be quickly restored to thereby operate normally.

While the inventive concept has been particularly shown and described with reference to embodiments thereof, it will be understood that various changes in form and details may be made therein without departing from the spirit and scope of the following claims.

What is claimed is:

1. A storage device comprising:
a non-volatile memory;
a memory controller configured to communicate with a host device through a first channel and configured to control the non-volatile memory; and
a sub controller configured to communicate with the host device through a second channel and configured to monitor an operation status of the memory controller,
wherein the sub controller is configured to perform operations comprising:
broadcasting state information of the storage device including the operation status to at least one external storage device through the second channel, and
performing a recovery operation on the memory controller when recovery information is received from the at least one external storage device through the second channel.

2. The storage device of claim 1, wherein the sub controller is configured to monitor the operation status at a preset reference cycle interval.

3. The storage device of claim 2, wherein the sub controller is configured to broadcast the state information of the storage device through the second channel at the preset reference cycle interval.

4. The storage device of claim 1, wherein the state information of the storage device comprises identification information, the operation status, a register value, and/or time information.

5. The storage device of claim 1, wherein the recovery information comprises at least one of identification information of a transmitting device, identification information of a receiving target device, a register value, or time information.

6. The storage device of claim 1, wherein the sub controller is configured to perform the recovery operation on the memory controller by inputting a register value included in the recovery information to the memory controller.

7. The storage device of claim 1, wherein the memory controller is configured to perform a verification operation to determine whether the operation status is in a normal state after the recovery operation is completed.

8. The storage device of claim 7, wherein the memory controller is configured to be reconnected to the host device through the first channel when the operation status is the normal state.

9. The storage device of claim 7, wherein the memory controller is configured to perform a hardware reset operation or a software reset operation when the operation status is an abnormal state.

10. The storage device of claim 9, wherein the hardware reset operation is performed using a dedicated pin connected between the host device and the storage device that is configured separately from an existing reset pin.

11. The storage device of claim 9, wherein the abnormal state comprises a hang state or an abort state.

12. The storage device of claim 1, wherein, when receiving the state information of the at least one external storage device through the second channel, the sub controller is configured to store the received state information of the at least one external storage device.

13. The storage device of claim 12, wherein, when the operation status included in the received state information of the at least one external storage device is in an abnormal state, the sub controller is configured to generate the recovery information of the at least one external storage device based on previous state information of the at least one external storage device and transmits the recovery information of the at least one external storage device to the at least one external storage device through the second channel.

14. A storage device comprising:
a first storage device including a first non-volatile memory, a first memory controller configured to communicate with a host device through a first channel, and a first sub controller configured to communicate with the host device through a second channel; and
a second storage device including a second non-volatile memory, a second memory controller configured to communicate with the host device through the first channel, and a second sub controller configured to communicate with the host device and the first sub controller through the second channel,
wherein the first sub controller is configured to broadcast state information of the first storage device including an operation status of the first memory controller through the second channel,
wherein the second sub controller is configured to generate recovery information of the first storage device based on previous state information of the first storage device when the operation status of the first memory controller is abnormal in response to the state information of the first storage device, and is configured to transmit the recovery information that was generated to the first storage device through the second channel.

15. The storage device of claim 14, wherein the first sub controller is configured to monitor the operation status of the first memory controller at a preset reference cycle interval, and configured to broadcast the state information of the first storage device through the second channel at the preset reference cycle interval.

16. The storage device of claim 14, wherein the first sub controller is configured to perform a recovery operation on the first memory controller based on the recovery information of the first storage device received through the second channel.

17. The storage device of claim 14, wherein the first memory controller and the second memory controller are connected to a central processing unit (CPU) of the host device through the first channel, and
wherein the first sub controller and the second sub controller are connected to a Baseboard Management Controller (BMC) of the host device through the second channel.

18. A storage system comprising:
a host device; and
a plurality of storage devices including a non-volatile memory, a memory controller configured to communicate with the host device through a first channel, and a sub controller configured to communicate with the host device and at least one external storage device through a second channel,
wherein a first sub controller included in a first storage device among the plurality of storage devices is configured to broadcast state information of the first storage device including an operation status of the memory controller that is an abnormal state through the second channel, and
wherein a second sub controller included in a second storage device among the plurality of storage devices is configured to generate recovery information of the first storage device based on previous state information of the first storage device, and is configured to transmit the recovery information that was generated to the first storage device through the second channel.

19. The storage system of claim 18, wherein the sub controller included in each of the plurality of storage devices is configured to monitor the operation status of the memory controller included in a same storage device at a preset reference cycle interval, and configured to broadcast state information of each of the plurality of storage devices through the second channel at the preset reference cycle interval.

20. The storage system of claim 18, wherein the second sub controller that is configured to transmit the recovery information is set as a master device among devices connected to the second channel.

* * * * *